UNITED STATES PATENT OFFICE.

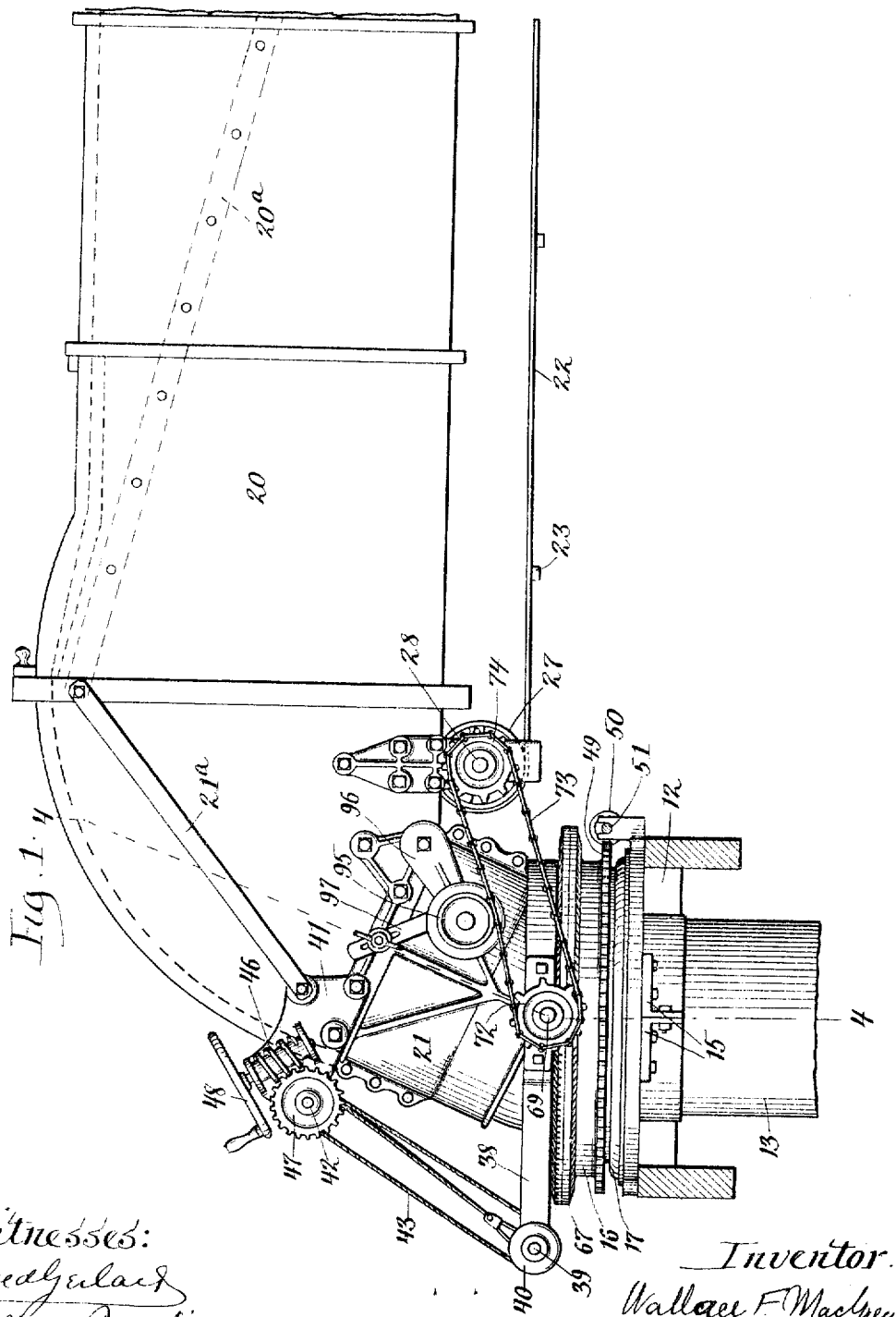

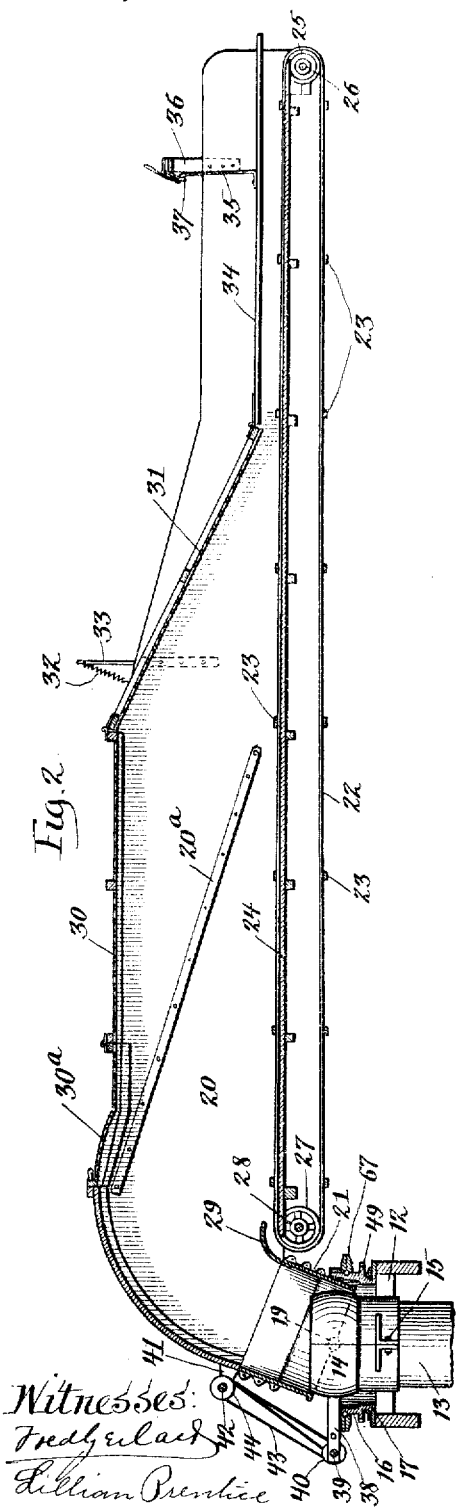

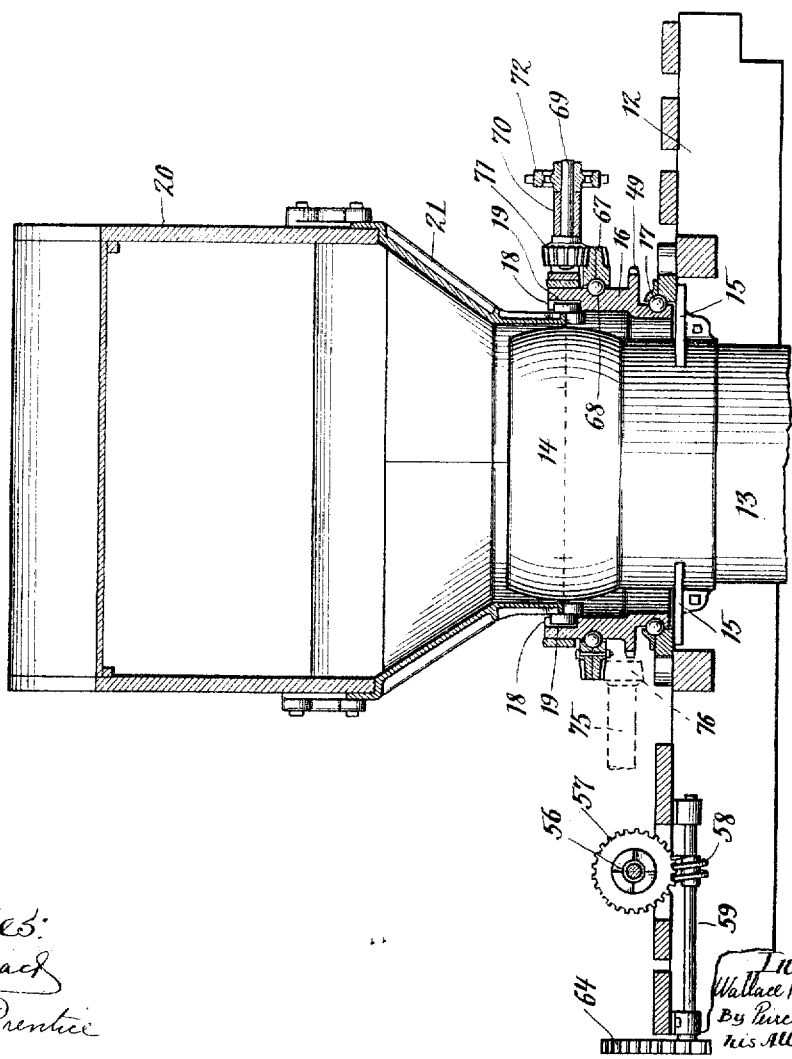

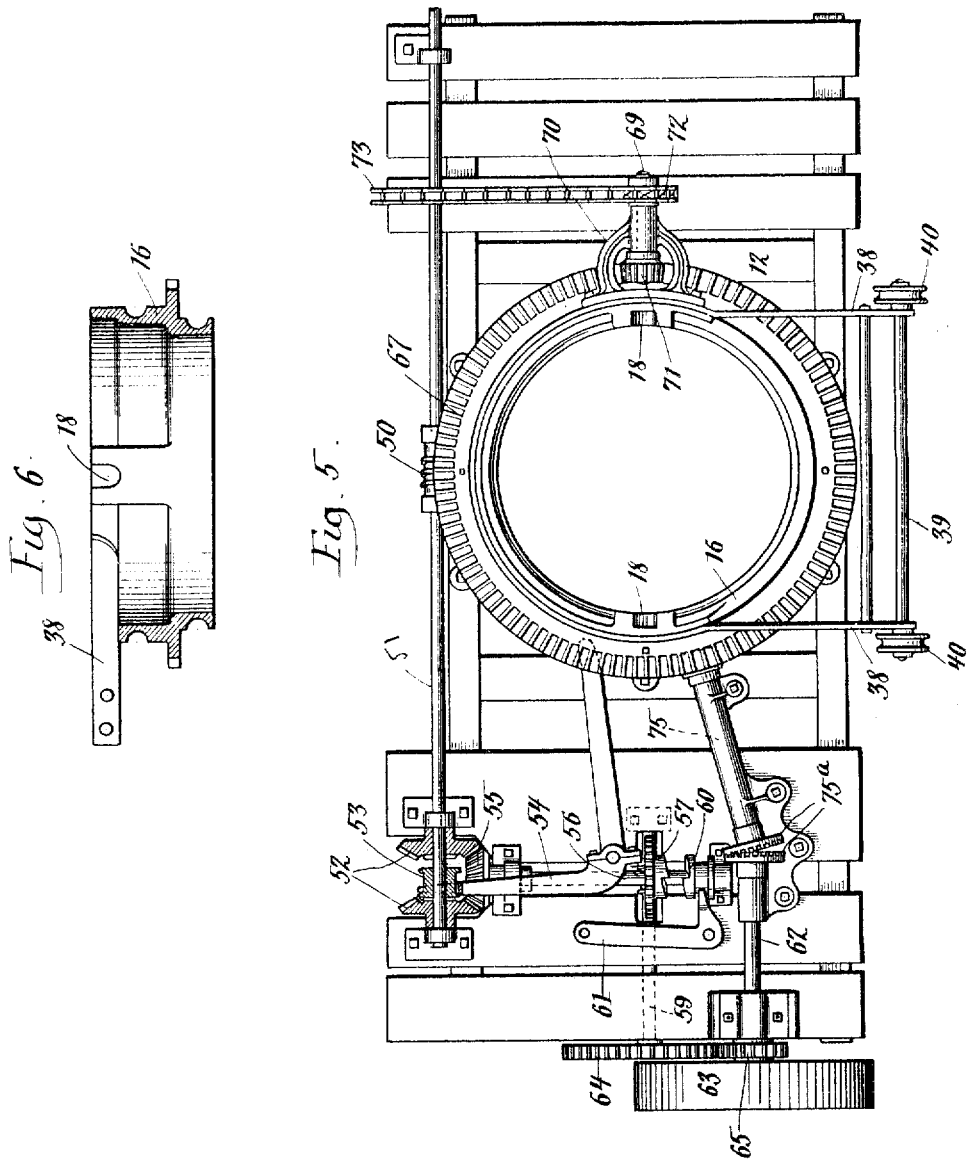

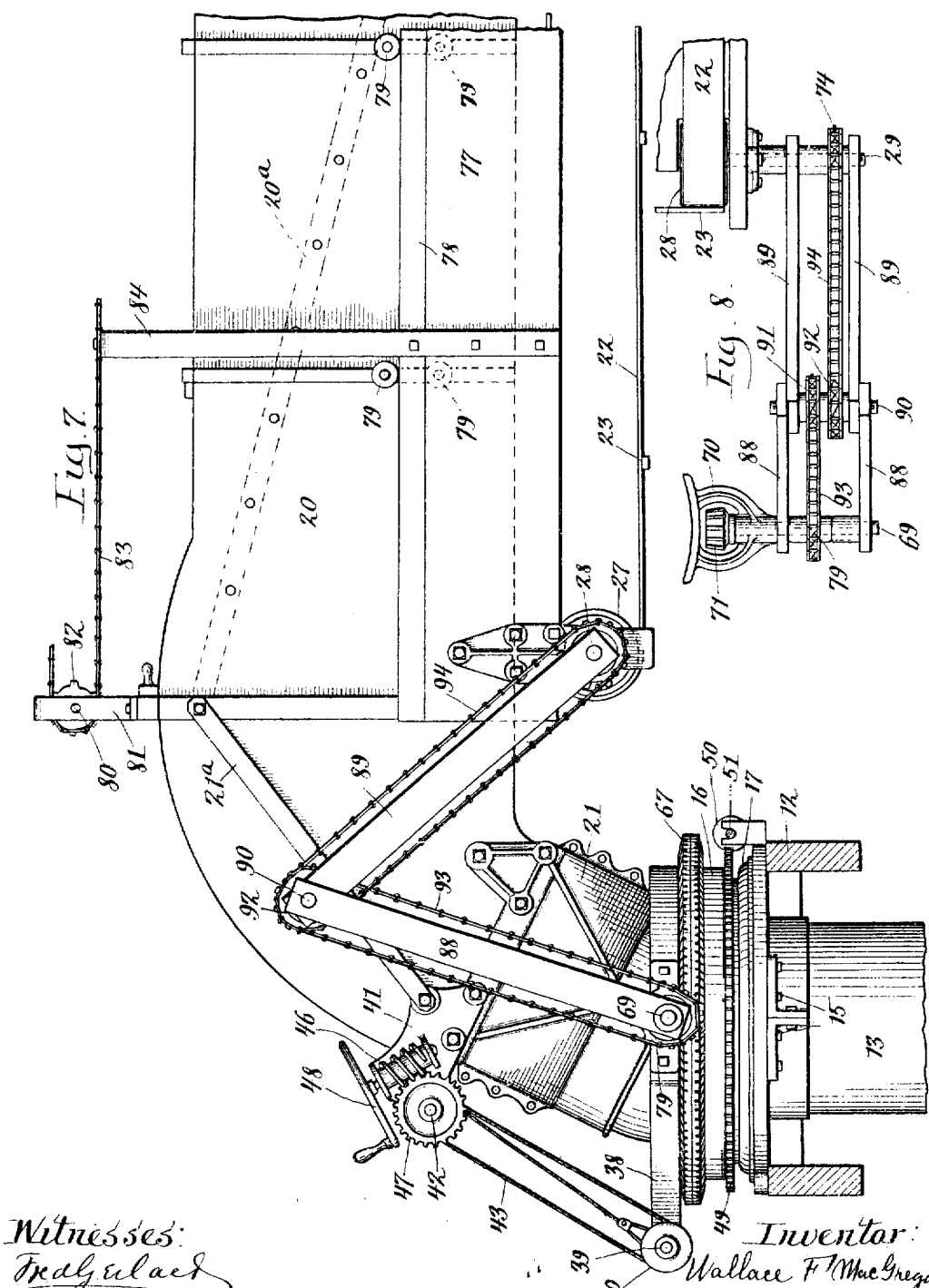

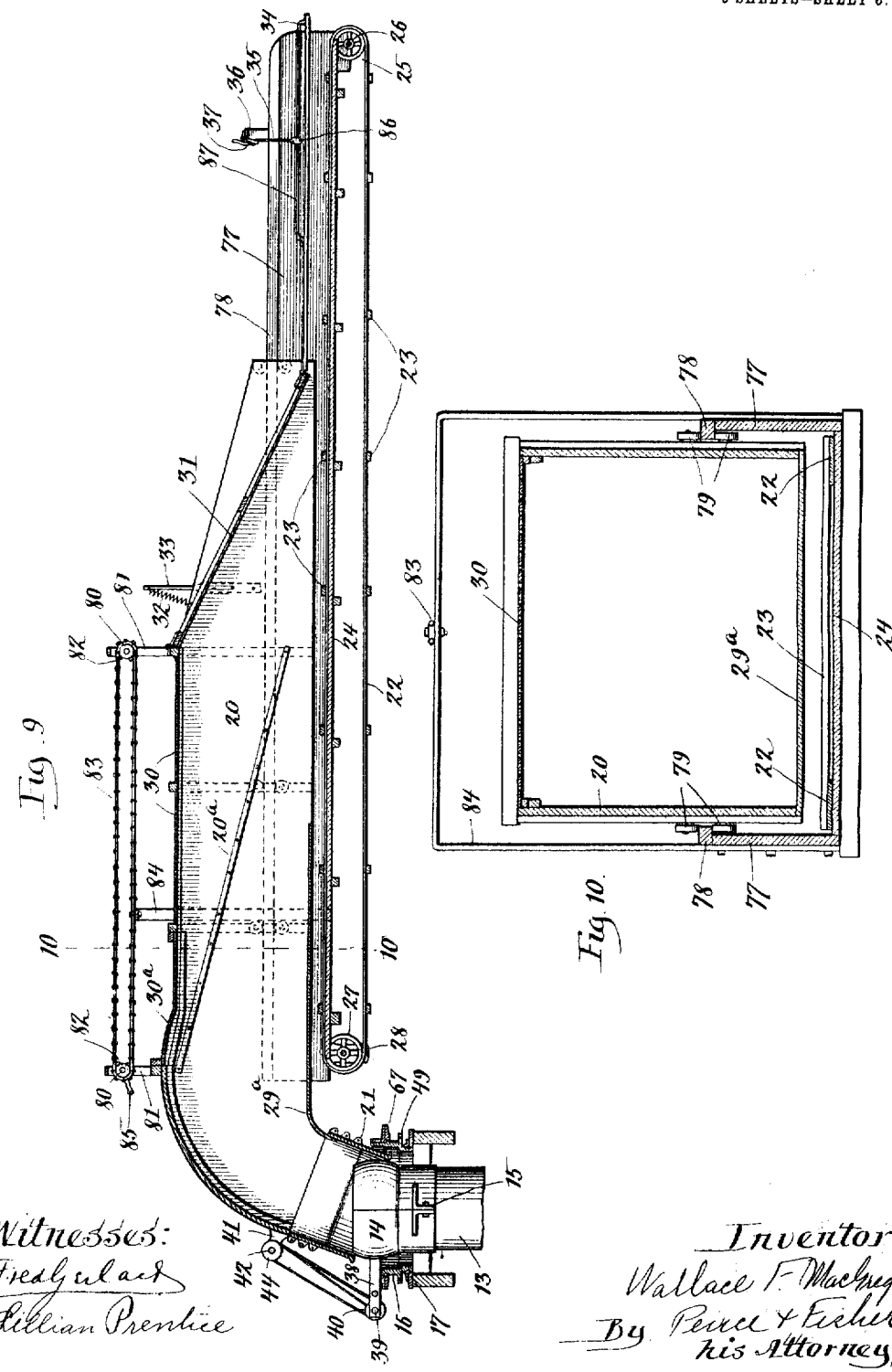

WALLACE F. MACGREGOR, OF RACINE, WISCONSIN, ASSIGNOR TO J. I. CASE THRESHING MACHINE COMPANY, OF RACINE, WISCONSIN, A CORPORATION.

STRAW-STACKER.

No. 903,743.　　　　Specification of Letters Patent.　　　　Patented Nov. 10, 1908.

Application filed October 31, 1903. Serial No. 179,278.

*To all whom it may concern:*

Be it known that I, WALLACE F. MACGREGOR, a citizen of the United States, and a resident of the city and county of Racine, in the State of Wisconsin, have invented certain new and useful Improvements in Straw-Stackers, of which the following is declared to be a full, complete, and exact description.

The improvement relates more particularly to that type of straw stackers in which the straw is delivered from the threshing machine by a blast of air to a mechanical conveyer whereby it is deposited on the stack, and the invention consists in the features of improvement hereinafter described, illustrated in the accompanying drawings and particularly pointed out in the appended claims.

In the drawings, Figure 1 is a side elevation of the improved straw stacker with its outer end broken away. Fig. 2 is a longitudinal section thereof. Fig. 3 is a plan view. Fig. 4 is a detail section on line 4—4 of Fig. 1. Fig. 5 is a plan view of the turntable and operating mechanism for the improved stacker. Fig. 6 is a detail section of the turn-table. Fig. 7 is a side elevation of a modified and preferred form of the improved stacker. Fig. 8 is a detail plan view of parts shown in Fig. 7. Fig. 9 is a longitudinal section of the form of stacker shown in Fig. 7. Fig. 10 is a cross section on line 10—10 of Fig. 9.

In the accompanying drawings the invention is shown as applied directly to a threshing machine, although manifestly the invention may be employed in an independent structure.

At the rear of the threshing machine (not shown) is mounted the usual platform 12 through which extends the outer end of the blower-pipe 13. Blower-pipe 13 leads from any usual form of discharge or blast-fan (not shown) of the threshing machine and its outer end extends (see Fig. 4) slightly above the platform 12, and is provided with a spherical terminal 14. The latter is preferably formed of separate sections secured together and to the platform 12 by brackets 15.

The turn-table 16 surrounds the outer end of the blower-pipe in concentric relation, but is spaced apart therefrom and sustained to rotate upon the platform 12 by the anti-friction ball-bearing 17. At its upper end and in line with the axis of the spherical terminal 14 of the blower-pipe, the turn-table 16 is provided with seats 18 which receive the pintles 19 of the delivery-chute 20. The pintles 19 are arranged at diametrically opposite points so that the delivery chute is pivoted to the turn-table in line with the axis thereof and in line with the axis of the blower-pipe. The latter is thus sustained to oscillate horizontally with the turn-table but may be vibrated in vertical direction independently of the turn-table. The inner end of the delivery-chute is curved downwardly, as indicated in elbow fashion, and the throat section 21 slidably fits the spherical outer end 14 of the blower-pipe so as to shift universally thereon as the delivery-chute is swung in vertical and horizontal direction.

The main portion of the delivery-chute is preferably rectangular in cross-section and is preferably of greater area in cross-section than the blower-pipe 13. The throat section 21 is preferably formed of separate rigid sections of cast metal having considerable strength and bolted together, as indicated in the drawings. The end of the contracted throat section is circular in outline to slidably fit the outer end of the blower-pipe, but as shown in Fig. 4 its outer larger end is of rectangular outline to contact with the main body of the delivery-chute.

At the lower and outer portions of the delivery-chute 20 extends the mechanical conveyer or endless traveling raddle which may be formed of a wide strip of continuous webbing supported at intervals on cross-rollers. This mechanical conveyer however preferably comprises the endless side belts 22 connected by the cross raddle strips 23 and arranged to move over the floor 24 which extends between the side walls of the chute 20. At the outer end the belts 22 pass over idler-rolls 25 mounted upon a shaft 26 between the side walls of the delivery-chute. At the inner end the belts pass over the drive-rolls 27 mounted upon a shaft 28.

The elbow portion of the delivery-chute is preferably formed with impervious walls and the lower curved portion 29 extends over the inner end of the conveyer so that the straw from the blower-pipe will be delivered onto the endless raddle. The upper wall of the delivery-chute or mechanical conveyer section beyond the elbow, is formed of a perforated screen 30 to permit the escape of the air-blast and so that the straw, instead of being blown through the chute, settles upon the traveling conveyer and is slowly and uniformly delivered to the stack. The expanded neck portion and the enlarged cross sectional area of the delivery-chute also assists in thus dissipating the air-blast which delivers the straw through the blower-pipe and elbow section of the delivery-chute onto the mechanical conveyer.

To assist in the uniform delivery of the straw onto the stack, a forwardly inclined retarding plate 31 is provided. This plate is preferably formed of a perforated screen and is preferably hinged to the forward end of the perforated top screen 30 and yieldingly supported by springs 32 connected to the retarding screen and to uprights 33 connected to the side walls of the chute.

To further insure uniform delivery of the straw, presser-bars 34, are preferably hinged to the forward end of the retarding screen 31 and extend forwardly over the outer end of the endless conveyer and in substantially parallel relation therewith. The outer ends of the presser-bars are sustained by straps 35 from supports 36, which are secured to and extend upwardly from the sides of the chute. The straps 35 are preferably secured to the supports 36 by knuckles 37 so that the presser-bars may be adjusted as desired. These presser-bars rest upon the straw at the outer end of the traveling conveyer and insure a uniform, even delivery onto the stack.

A portion of the top-wall of the delivery-chute 20 at its rear end, is preferably formed of a hinged, outwardly opening section 30ª which may be lifted to give access to the interior of the chute if at any time the straw becomes clogged therein. This section 30ª is also preferably perforated, as shown.

The turn-table 16 carries a pair of laterally projecting arms 38 between the outer ends of which is journaled a shaft 39 carrying rollers 40. Brackets 41 are secured to the cast iron neck or throat 21 of the delivery-chute and support the windlass shaft 42. Ropes 43 are secured at one end to the shaft 39, extend over guide-rolls 44 upon the windlass shaft 42, thence over the rolls 40 upon the shaft 39 and back to the winding rolls 45 upon the windlass shaft. The windlass shaft 42 is rotated in either direction by a worm 46, journaled on one of the brackets 41 and meshing with the teeth of a gear 47 fixed to the windlass shaft 42. The worm 46 is preferably provided with a hand-wheel 48, as indicated. By this arrangement the delivery-chute and mechanical conveyer may be vibrated vertically in any position of the supporting turn-table.

By forming the neck or throat portion 21 of rigid cast metal, the vertically vibrating windlass ropes may extend between the outer end of the rigid portion and the turn-table, thus doing away with the necessity of the cumbersome, vertically projecting windlass frame on the turn-table now generally employed.

The turn-table and delivery-chute are preferably oscillated through the medium of a worm-gear 49 formed upon the turn-table, which meshes with the worm 50 on a cross shaft 51. Shaft 51 (see Fig. 5) is journaled upon the platform 12 and is preferably provided at one end thereof with a pair of oppositely facing beveled pinions 52 arranged to be alternately coupled to the shaft by a clutch 53, automatically operated in the usual manner by a lever or bell-crank 54. Beveled gears 52 are driven by a third beveled gear 55 upon a short shaft 56 journaled on the upper side of the platform 12. This latter shaft is driven through the medium of a worm-wheel 57 and worm 58 from a cross shaft 59 journaled, as most plainly indicated in Fig. 4 upon the under side of the platform 12. Worm-wheel 57 is loosely mounted upon the shaft 56 but it may be coupled thereto by a clutch 60 and having a shift lever 61.

A pulley-shaft 62 is journaled upon the upper side of the platform 12 and carries at its outer end a pulley 63 which may be belted to the drive shaft of the threshing machine. Intermeshing gears 64 and 65 are mounted respectively upon the cross-shaft 59 and the pulley shaft 62.

For driving the endless mechanical conveyer in all positions thereof, an annular double-faced rack or gear-ring 67 is preferably employed. This gear-ring is preferably formed of separate upper and lower horizontal sections bolted together and is sustained in concentric relation upon and about the upper portion of the turn-table by a row of bearing-balls 68 traveling in a suitable annular race-way in the face of the turn-table and in a corresponding race-way formed between the sections of the gearing, so that the latter may revolve independently of the turn-table.

Suitable drive connections are interposed between the gearing and the mechanical conveyer, which preferably comprise a short stub shaft 69 journaled in a laterally projecting bracket 70, fixed to the upper portion of the turn-table in line with the pintle connections 18—19 and provided at its inner end with a beveled gear 71 meshing with the teeth upon the upper face of the gear-ring. A sprocket 72 upon the outer end of the shaft 69 is connected by a sprocket-chain 73 with a second sprocket-wheel 74, fixed to the end of the shaft 28, which carries the drive-rolls 36 of the endless conveyer.

A short shaft 75 radially disposed with reference to the turn-table 16 and gear-ring 67, carries at its inner end a beveled pinion 76 which meshes with the teeth upon the under side of the gear-ring 67. This shaft 75 is located in the same plane but out of line with the pulley shaft 62 and is geared thereto by a pair of beveled gears 75ª. By the mechanism described, the mechanical conveyer may be driven in all positions of the delivery-chute.

It will be noted that the delivery-chute or mechanical conveyer section is removably sustained upon the turn-table and is in coöperative relation with the blower-pipe so that if desired, a delivery-chute entirely pneumatic in character, could be readily sustained therefrom if desired.

In the preferred form of the invention, the arrangement of the blower-pipe, turn-table and delivery-chute is similar to that already described, but the mechanical conveyer is extensibly mounted upon the chute so that a wider stack may be formed. In this construction, (see Figs. 8 to 10) the mechanical conveyer is carried by the delivery-chute to swing horizontally and vertically therewith as before, but the raddle belts 22, rolls 25 and 27 and the conveyer floor 24, are extensibly sustained thereon between the side pieces 77. These side pieces are provided at their upper edges with inwardly projecting rails 78 which extend between coöperating pairs of supporting and guide rolls 79, journaled upon the sides of the delivery-chute 20. Three pairs of these rolls are provided upon each side of the chute, but any suitable number may be provided as necessary.

Cross-shafts 80 are journaled between uprights 81 at the forward and rear ends of the delivery-chute 20 and carries sprockets 82 over which passes the endless chain 83. The chain 83 is connected, as shown, to a bale 84 fixed to and projecting upwardly from the side pieces 77 of the extensible conveyer and the shaft 82, at the inner end of the chute, is provided with a crank 85 by which the chain 83 may be shifted in opposite directions to move the extensible conveyer. In this form the supporting straps 35 for the presser-bars 34 are connected to the supports 36, which is secured to the side pieces 77 of the extensible conveyer. The straps 35 are provided with loops 86 arranged to slide upon rods 87, fixed to the presser-bars 34. The lower plate 29ª of the delivery-chute in this form of the invention, projects forwardly so as to extend over the inner end of the conveyer, whatever the position of the latter, and so that the straw from the blower-pipe will be delivered onto the endless traveling raddle.

Extensible drive-connections are provided for the endless conveyer which preferably comprises a pair of arms 88 (see Figs. 7 and 8) pivoted upon the shaft 69 and a pair of pivoted arms 89 pivotally mounted upon the drive-shaft 28 of the endless conveyer. The upper ends of the arms 88 and 89 are pivotally connected together by a cross-shaft 90 upon which is mounted a pair of sprocket wheels 91 and 92. A chain 93 connects the sprocket 72 upon the shaft 69 with the sprocket 91 and a chain 94 connects the sprocket 92 with the sprocket-wheel 74 upon the drive shaft 29 of the conveyer. The arrangement and construction of the parts in other respects is similar to that previously described.

In the modified form, it will be seen that the driving mechanism for the mechanical conveyer is so arranged that the latter may be operated in all positions of the delivery-chute and in all positions of the extensible conveyer with reference thereto.

It is obvious that numerous changes may be made in the details of structure without departure from the essentials of the invention and that features of the invention may be employed without its adoption as an entirety.

Having described my invention, what I claim as new and desire to secure by Letters Patent, is:—

1. In straw-stackers, the combination with the blower-pipe, of a turn-table at the outer end of said pipe, a vibratable delivery-chute sustained by said turn-table and slidably fitting the end of said blower-pipe to shift universally thereon, and a mechanical conveyer carried by and coöperating with said chute to deliver the straw therefrom.

2. In straw-stackers, the combination with the blower-pipe, of a turn-table at the outer end of said pipe, a delivery chute sustained from said turn-table and slidably fitting the end of said blower-pipe to shift universally thereon, an endless traveling conveyer carried by said chute to deliver straw therefrom, a gear sustained concentrically with said turn-table, and rotatable independently thereof, drive connection between said gear and said endless conveyer and means for driving said gear.

3. In straw-stackers, the combination with the blower-pipe, of a turn-table at the outer end of said pipe, a delivery-chute arranged to receive straw from said blower-pipe and having pintle connections with said turn-table, a mechanical conveyer carried by said chute to deliver straw therefrom, a ring-gear sustained concentric with said turn-table, a shaft driven by said gear and carried by said turn-table in line with said pintle-connections, and drive connections between said shaft and said conveyer.

4. In straw-stackers, the combination with the blower-pipe, of a turn-table concentrically sustained at the outer end thereof, a delivery-chute having pintle connections with said turn-table in line with the axis thereof, an endless traveling conveyer carried by said chute to deliver straw therefrom, a ring-gear concentric with said turn-table but rotatable independently thereof, a stub-shaft journaled on said turn-table in line with said pintle-connections, a gear on said shaft meshing with said ring-gear, drive-connections between said shaft and said endless conveyer, and means for driving said ring-gear.

5. In straw-stackers, the combination with a blower-pipe, of a turn-table surrounding the outer end of said pipe, a delivery-chute and a coöperating mechanical conveyer pivotally sustained upon said turn-table, a double-faced gear-ring surrounding and rotatably sustained upon said turn-table, a gear meshing with one face of said gear-ring to drive the same, a gear sustained upon said turn-table and meshing with the other face of said gear-ring, and connection between said last-mentioned gear and said mechanical conveyer.

6. In straw-stackers, the combination with a blower-pipe, of a delivery-chute arranged to receive straw therefrom, a mechanical conveyer, mechanism for driving said conveyer comprising an interiorly-grooved gear-ring and connection between the same and said conveyer, an exteriorly-grooved cylindrical support for said gear-ring, and a row of anti-friction balls interposed in said grooves between said support and said gear-ring.

7. In straw-stackers, the combination with a blower-pipe, of a delivery-chute arranged to receive straw therefrom, a mechanical conveyer, mechanism for driving said conveyer comprising an interiorly-grooved gear-ring and connection between the same and said conveyer, an exteriorly-grooved cylindrical support for said gear-ring, and a row of anti-friction balls interposed in said grooves between said support and said gear-ring, said ring being formed of connected flat-sections disposed on opposite sides of said row of anti-friction balls so as to be carried thereby upon said support.

8. In straw-stackers, the combination with a blower-pipe, of a turn-table at the outer end thereof, a delivery-chute and a coöperating mechanical conveyer pivotally mounted upon said turn-table, a gear-ring independently rotatable about the axis of said turn-table, driving connections between said gear-ring and said mechanical conveyer, a pulley shaft, gearing between said pulley shaft and said gear-ring and gearing between said pulley shaft and said turn-table.

9. In straw-stackers, the combination with a blower-pipe, of a turn-table at the outer end thereof, a delivery-chute and a coöperating mechanical conveyer pivotally mounted upon said turn-table, a gear-ring independently rotatable about the axis of said turn-table, driving connections between said gear-ring and said mechanical conveyer, a pulley shaft, a radially disposed shaft geared to said pulley shaft and to said gear-ring and a drive shaft for said turn-table also geared to said pulley shaft.

10. In straw-stackers, the combination with the blower-pipe, of a turn-table at the outer end of said pipe, a delivery-chute and coöperating mechanical conveyer sustained upon said turn-table, said chute being of greater cross-sectional area than said blower-pipe and having a contracted throat-section slidably fitting said blower-pipe to shift universally thereon.

11. In straw-stackers, the combination with the blower-pipe, of a turn-table at the outer end of said pipe, a delivery-chute and coöperating mechanical conveyer sustained upon said turn-table, said chute being of greater cross-sectional area than said blower-pipe and having a rigid, cast metal, contracted throat-section fitted over the open ends of said blower-pipe.

12. In straw-stackers, the combination with the blower-pipe, of a turn-table surrounding the outer end of said pipe, and a delivery-chute swiveled upon said turn-table and having a rigid, cast-metal throat-section slidably fitting said blower-pipe to shift universally thereon.

13. In straw-stackers, the combination with the blower-pipe, of a turn-table surrounding the outer end of said pipe, a delivery-chute swiveled upon said turn-table and having a rigid, cast-metal throat-section slidably fitting the outer end of said blower-pipe, a windlass mounted on said cast-metal throat-section and ropes connecting said windlass and said turn-table.

14. In straw-stackers, the combination with the blower-pipe, of a delivery-chute and coöperating mechanical conveyer arranged to receive straw from said blower-pipe, and a yielding, forwardly inclined perforated plate for retarding the movement of straw through said chute.

15. In straw-stackers, the combination with the blower-pipe, of a delivery-chute and coöperating mechanical conveyer arranged to receive straw from said blower-pipe, a yielding, inclined plate for retarding the movement of straw through said chute and yielding presser-bars extending forwardly from said plate over said conveyer.

16. In straw-stackers, the combination with the blower-pipe, of a delivery-chute and coöperating mechanical conveyer arranged to receive straw from said blower-pipe, and yieldingly supported presser-bars extending in substantially parallel relation over the outer end of said mechanical conveyer.

17. In straw-stackers, the combination with the blower-pipe, of a delivery-chute and coöperating mechanical conveyer arranged to receive straw from said blower-pipe, said delivery-chute having on one side adjacent its inner end, a hinged, outwardly opening section.

18. In straw-stackers, the combination with the blower-pipe, of a turn-table at the outer end of said pipe, a vertically-vibratable delivery-chute removably swiveled upon said turn-table, a mechanical conveyer carried by said chute to deliver straw therefrom, and independent means for driving said conveyer and for driving said turn-table.

19. In straw-stackers, the combination with a blower-pipe, of a delivery-chute arranged to receive straw from said pipe and an extensible conveyer to deliver straw therefrom.

20. In straw-stackers, the combination with a blower-pipe, of a delivery-chute arranged to receive straw therefrom, an extensible mechanical conveyer arranged to deliver straw from said chute, said conveyer being movable lengthwise with respect to said chute and being supported to oscillate therewith in vertical and horizontal direction.

21. In straw-stackers, the combination with a blower-pipe and a delivery-chute arranged to receive straw therefrom, of a mechanical conveyer extensibly suspended from said chute and means whereby said conveyer may be shifted lengthwise of said chute.

22. In straw-stackers, the combination with a blower-pipe, of a delivery-chute arranged to receive straw therefrom, a mechanical conveyer and rails and anti-friction rollers arranged to extensibly support said conveyer upon said delivery-chute.

23. In straw-stackers, the combination with a blower-pipe, of an extensible, vertically and horizontally vibratable mechanical conveyer arranged to receive straw from said pipe and an extensible gearing mounted to swing with said conveyer for driving the same.

24. In straw-stackers, the combination with a blower-pipe, of a vertically and horizontally vibratable delivery-chute arranged to receive straw from said pipe, a mechanical conveyer arranged to swing with said chute and shift longitudinally with respect thereto, a gear concentrically arranged at the outer end of said blower-pipe and an extensible drive-gearing between said gear and said conveyer, said extensible gearing being mounted to swing with said chute.

25. In straw-stackers, the combination with a pneumatic delivery-chute, of an extensible conveyer for receiving straw from said chute, a gear ring adjacent the inner end of said chute and extensible gearing mounted to swing with said chute connecting said gear ring with said extensible conveyer.

26. In straw-stackers, the combination with a pneumatic delivery-chute and a turn-table for supporting said chute, of an extensible mechanical conveyer for receiving straw from said chute and mechanism for imparting movement to said conveyer comprising a gear ring located at the base of said chute, the gear meshing with said gear ring, a support for said gear mounted on the turn-table and suitable extensible connections between said gear and the conveyer.

27. In straw-stackers, the combination with a pneumatic delivery-chute and a turn-table for supporting said chute, of an extensible mechanical conveyer for receiving straw from said chute and mechanism for imparting movement from said conveyer comprising a gear-ring located at the base of said chute, a gear meshing with said gear-ring, a support for said gear mounted on the turn-table sprocket-chains and wheels connecting said gear with the conveyer and pivoted arms for supporting said sprocket chains and wheels.

28. In straw-stackers, the combination with a blower-pipe, of a turn-table at the outer end of said pipe, a delivery-chute pivotally sustained upon said turn-table and arranged to receive straw from said blower-pipe, an endless raddle coöperating with said delivery-chute to deliver straw therefrom, a carrier-frame for said raddle extensibly mounted upon said chute and means for driving said endless raddle in all positions of the chute and in all positions of the raddle-carrier.

29. In straw-stackers, the combination with a blower-pipe, of a turn-table at the outer end of said pipe, a delivery-chute pivotally sustained upon said turn-table and arranged to receive straw from said blower-pipe, an endless raddle coöperating with said delivery-chute to deliver straw therefrom, a carrier-frame for said raddle extensibly mounted upon said chute, a gear-ring sustained concentric with said turn-table but rotatable independently thereof and extensible gearing between said gear-ring and said endless raddle.

30. In straw stackers, the combination with the blower-pipe, of a turn table sustained concentrically at the outer end of said pipe, a mechanical conveyer pivotally connected to said turn-table at diametrically opposite points and arranged to receive straw from said blower-pipe, a gear for operating said conveyer carried by said turntable in line with the pivot connections between the turn-table and mechanical conveyer and means for operating said gear, substantially as described.

31. In straw stackers, the combination with the blower-pipe, of a turn table surrounding the outer end of said pipe, a delivery chute pivoted to said turn-table in line with the axis thereof and arranged to receive straw from said blower-pipe, an endless conveyer carried by said chute to deliver straw therefrom, a gear-ring concentrically and rotatably mounted upon said turn-table, operating connections between said gear-ring and said endless conveyer, means for operating said turn-table and means for independently operating said gear-ring, substantially as described.

32. In straw stackers, the combination with the blower pipe, of a delivery chute and coöperating mechanical conveyer arranged to receive straw from said blower pipe, said delivery chute having a perforated upper portion and an inclined perforated retarding plate at its end, substantially as described.

33. In straw-stackers, the combination with the turn-table, of a delivery chute having a tubular throat portion pivoted at diametrically opposite points upon said turn-table, a mechanical conveyer carried by and coöperating with said chute to deliver straw therefrom, mechanism for operating said turn-table and independent mechanism for driving said conveyer in all positions of said turn-table and of the chute pivoted thereto, substantially as described.

34. In straw stackers, the combination with the turn-table, of a delivery chute having a tubular throat portion pivoted at diametrically opposite points upon said turn-table, a mechanical conveyer carried by and coöperating with said chute to deliver straw therefrom, a gear concentric with but rotatable independently of said turn-table, a pinion meshing with said gear and mounted on said turn-table in line with the pivots between the turn-table and delivery chute and driving connections between said pinion and said mechanical conveyer.

35. In straw stackers, the combination with the turn-table, of a delivery chute having a tubular throat portion pivoted at diametrically opposite points upon said turn-table, a mechanical conveyer carried by and coöperating with said chute to deliver straw therefrom, a gear concentric with but rotatable independently of said turn-table, a shaft carried by said turn-table in line with the pivoted connections between said turn table and the delivery chute, a pinion on said shaft meshing with said gear, and drive connections between said shaft and said mechanical conveyer.

36. In straw stackers, the combination with the blower pipe, of a turn table sustained concentrically at the outer end of said blower pipe, a delivery chute pivoted to said turn-table at diametrically opposite points, said chute having an open bottom at its outer end, a mechanical conveyer extending beneath the open bottom of said chute and sustained therefrom and mechanism mounted on said turn table for driving said conveyer, substantially as described.

WALLACE F. MacGREGOR.

Witnesses:
EDWIN E. RUSSELL,
ELLIS J. GITTINS.